United States Patent
Baika

(10) Patent No.: US 10,586,991 B2
(45) Date of Patent: Mar. 10, 2020

(54) FUEL CELL SYSTEM AND FUEL CELL SYSTEM CONTROL METHOD

(71) Applicant: TOYOTA JIDOSHA KABUSHIKI KAISHA, Toyota-shi, Aichi-ken (JP)

(72) Inventor: Toyokazu Baika, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 238 days.

(21) Appl. No.: 15/518,858

(22) PCT Filed: Oct. 5, 2015

(86) PCT No.: PCT/JP2015/078131
§ 371 (c)(1),
(2) Date: Apr. 13, 2017

(87) PCT Pub. No.: WO2016/067830
PCT Pub. Date: May 6, 2016

(65) Prior Publication Data
US 2017/0229721 A1 Aug. 10, 2017

(30) Foreign Application Priority Data

Oct. 29, 2014 (JP) ................................ 2014-220730

(51) Int. Cl.
*H01M 8/04223* (2016.01)
*H01M 8/04225* (2016.01)
(Continued)

(52) U.S. Cl.
CPC ......... *H01M 8/04225* (2016.02); *H01M 8/04* (2013.01); *H01M 8/04014* (2013.01);
(Continued)

(58) Field of Classification Search
CPC .................................................... H01M 8/042
See application file for complete search history.

(56) References Cited

FOREIGN PATENT DOCUMENTS

| JP | 2005-235584 A | 9/2005 |
| JP | 2006-080027 A | 3/2006 |

(Continued)

OTHER PUBLICATIONS

English translation of Fujio, JP2014-035960.*
English translation of Koyama et al., JP2013-109895.*

*Primary Examiner* — Niki Bakhtiari
(74) *Attorney, Agent, or Firm* — Hunton Andrews Kurth LLP

(57) ABSTRACT

A fuel cell system includes: a fuel cell stack; a coolant circulation path through which coolant for cooling the fuel cell stack flows; a cathode gas supply flow path that is connected to an inlet of the fuel cell stack, and in which a compressor that supplies cathode gas to the fuel cell stack is arranged; an intercooler that is arranged between an outlet of the compressor and the inlet of the fuel cell stack in the cathode gas supply flow path, is connected to the coolant circulation path, and cools cathode gas discharged from the compressor with use of the coolant; and a regulating valve that is arranged in the cathode gas supply flow path, and regulates a pressure between the outlet of the compressor and the inlet of the fuel cell stack when the fuel cell stack is being started at low temperature.

4 Claims, 3 Drawing Sheets

(51) Int. Cl.
*H01M 8/04* (2016.01)
*H01M 8/04701* (2016.01)
*H01M 8/04746* (2016.01)
*H01M 8/04302* (2016.01)
*H01M 8/04014* (2016.01)
*H01M 8/04082* (2016.01)
*H01M 8/04089* (2016.01)
*H01M 8/04029* (2016.01)
*H01M 8/0432* (2016.01)
*H01M 8/0438* (2016.01)
*H01M 8/1018* (2016.01)

(52) U.S. Cl.
CPC ... *H01M 8/04029* (2013.01); *H01M 8/04097* (2013.01); *H01M 8/04201* (2013.01); *H01M 8/04268* (2013.01); *H01M 8/04302* (2016.02); *H01M 8/04701* (2013.01); *H01M 8/04746* (2013.01); *H01M 8/04753* (2013.01); *H01M 8/04335* (2013.01); *H01M 8/04358* (2013.01); *H01M 8/04395* (2013.01); *H01M 2008/1095* (2013.01)

(56) References Cited

FOREIGN PATENT DOCUMENTS

| | | |
|---|---|---|
| JP | 2008-103174 A | 5/2008 |
| JP | 2008-277075 A | 11/2008 |
| JP | 2010-027217 A | 2/2010 |
| JP | 2010-277747 A | 12/2010 |
| JP | 2013-109895 A | 6/2013 |
| JP | 2014-035960 A | 2/2014 |

* cited by examiner

FUEL CELL SYSTEM AND FUEL CELL SYSTEM CONTROL METHOD

CROSS-REFERENCE TO RELATED APPLICATIONS

This is a national phase application based on the PCT International Patent Application No. PCT/JP2015/078131 filed Oct. 5, 2015, claiming priority to Japanese Patent Application No. 2014-220730 filed Oct. 29, 2014, the entire contents of both of which are incorporated herein by reference.

TECHNICAL FIELD

The present invention relates to a fuel cell system and a fuel cell system control method.

BACKGROUND ART

There has been known a fuel cell system that carries coolant for cooling a fuel cell stack into an intercooler arranged further downstream than a compressor, which compresses and feeds cathode gas (oxidation gas), to cool the cathode gas passing through the intercooler (see, for example, Patent Document 1). A fuel cell system equipped with an intercooler is disclosed also in, for example, Patent Document 2.

PRIOR ART DOCUMENT

Patent Document

[Patent Document 1] Japanese Patent Application Publication No. 2010-277747
[Patent Document 2] Japanese Patent Application Publication No. 2008-277075

SUMMARY OF THE INVENTION

Problems to be Solved by the Invention

When a fuel cell system is started at low temperature, the rapid increase in temperature of the fuel cell stack may be required. Here, since the cathode gas that has been compressed by a compressor and increased in temperature flows into an intercooler arranged further downstream than the compressor, it may be considered to increase the temperature of the fuel cell stack rapidly by promoting the temperature increase of coolant that exchanges heat with the cathode gas. The increase in pressure at the outlet of the compressor increases the temperature of cathode gas more effectively, and as a result, increases the temperature of the coolant carried into the intercooler. The pressure at the outlet of the compressor can be increased by increasing a back pressure with use of a so-called back pressure valve arranged at the outlet of the fuel cell stack. However, a required pressure based on the requirement such as the operating state of the fuel cell stack is set to the fuel cell system. Thus, it is difficult to blindly increase the back pressure to increase the coolant temperature. Especially at low-temperature starting, low-efficiency operation that decreases the amount of cathode gas to be supplied to the fuel cell stack may be executed to increase the temperature of the fuel cell stack. In contrast, the amount of cathode gas to be supplied to the fuel cell stack increases when the pressure at the outlet of the compressor is increased by increasing the back pressure.

That is, the increase in back pressure increases the amount of cathode gas to be supplied to the cathode, and accumulates the cathode gas. This disturbs the low-efficiency operation, and the stack temperature cannot be increased. Therefore, it is difficult to increase the temperature of cathode gas by increasing the back pressure. That is, the increase in back pressure conflicts with the pressure requirement of the fuel cell stack and the requirement for the temperature increase of cathode gas.

Thus, the fuel cell system and the fuel cell system control method disclosed in the present description aim to rapidly increase the temperature of coolant to be supplied to a fuel cell stack, and increase the temperature of the fuel cell stack.

Means for Solving the Problems

To achieve the above goal, the fuel cell system disclosed in the present description includes: a fuel cell stack; a coolant circulation path through which coolant for cooling the fuel cell stack flows; a cathode gas supply flow path that is connected to an inlet of the fuel cell stack, and in which a compressor that supplies cathode gas to the fuel cell stack is arranged; an intercooler that is arranged between an outlet of the compressor and the inlet of the fuel cell stack in the cathode gas supply flow path, is connected to the coolant circulation path, and cools cathode gas discharged from the compressor with use of the coolant; and a regulating valve that is arranged between the intercooler and the inlet of the fuel cell stack in the cathode gas supply flow path, wherein the regulating valve increases a pressure in a first part of the cathode gas supply flow path separately from a pressure in a second part of the cathode gas supply flow path when increase in temperature of the fuel cell stack is requested, the first part including the intercooler and being from the outlet of the compressor to the regulating valve, the second part including a cathode flow path formed in the fuel cell stack and being located further downstream than the regulating valve.

The above configuration allows the pressure between the outlet of the compressor and the inlet of the fuel cell stack to be increased separately from the pressure in the fuel cell stack, increasing the temperature of coolant in the intercooler. Accordingly, the temperature of the fuel cell stack can be rapidly increased with the coolant of which the temperature has been increased.

The fuel cell system may further include: a circulation path that diverges from the cathode gas supply flow path at a downstream side of the compressor, and is connected to an upstream side of the compressor; and a circulation control valve that is arranged in the circulation path, and that circulates the cathode gas to the cathode gas supply flow path and the circulation path including the compressor when the increase in temperature of the fuel cell stack is requested. For example, the circulation path may diverge, between the compressor and the intercooler, from the cathode gas supply flow path, or the circulation path may diverge, at a downstream side of the intercooler, from the cathode gas supply flow path.

The temperature of cathode gas can be effectively increased by circulating cathode gas prior to being supplied to the fuel cell stack and making the cathode gas pass through the compressor several times.

The fuel cell system control method disclosed in the present description is a fuel cell system control method in a fuel cell system including: a fuel cell stack; a coolant circulation path through which coolant for cooling the fuel cell stack flows; a cathode gas supply flow path that is connected to an inlet of the fuel cell stack, and in which a compressor that supplies cathode gas to the fuel cell stack is arranged; an intercooler that is arranged between an outlet of the compressor and the inlet of the fuel cell stack in the cathode gas supply flow path, is connected to the coolant circulation path, and cools cathode gas discharged from the compressor with use of the coolant, the method including: increasing a pressure in a first part of the cathode gas supply flow path separately from a pressure in a second part of the cathode gas supply flow path with use of a regulating valve that is arranged between the intercooler and the inlet of the fuel cell stack in the cathode gas supply flow path when increase in temperature of the fuel cell stack is requested, the first part including the intercooler and being from the outlet of the compressor to the regulating valve, the second part including a cathode flow path formed in the fuel cell stack and being located further downstream than the regulating valve. The above configuration allows the pressure between the outlet of the compressor and the inlet of the fuel cell stack to be increased separately from the pressure in the fuel cell stack, increasing the temperature of coolant in the intercooler. Accordingly, the temperature of the fuel cell stack can be rapidly increased with the coolant of which the temperature has been increased.

The above fuel cell system control method may further include circulating the cathode gas through the cathode gas supply flow path and a circulation path including the compressor when increase in temperature of the fuel cell stack is requested. The temperature of cathode gas can be effectively increased by circulating cathode gas prior to being supplied to the fuel cell stack and making the cathode gas pass through the compressor several times.

Effects of the Invention

The fuel cell system and the fuel cell system control method disclosed in the present description can rapidly increase the temperature of coolant to be supplied to a fuel cell stack, and increase the temperature of the fuel cell stack.

MODES FOR CARRYING OUT THE INVENTION

Figure 1:
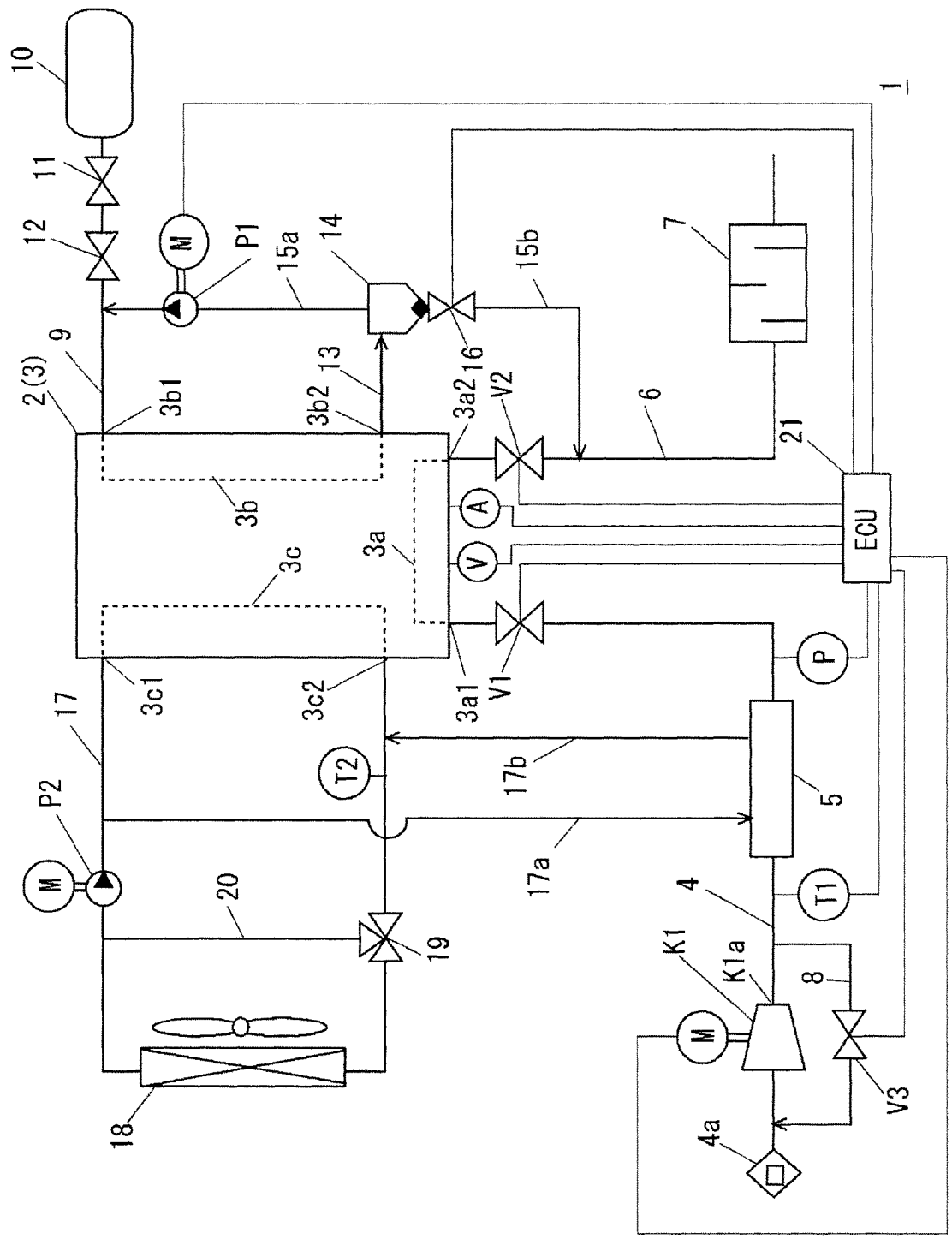
FIG. 1 illustrates an outline structure of a fuel cell system in accordance with a first embodiment.

Hereinafter, embodiments of the present invention will be described with reference to the accompanying drawings. The dimensions and the ratios of some components may not completely correspond to actual ones in the drawings. Some drawings may omit the illustration of the details of components or may omit components actually installed.

First Embodiment

With reference to FIG. 1, a fuel cell system 1 of a first embodiment will be described. FIG. 1 illustrates an outline structure of the fuel cell system 1 of the first embodiment. The fuel cell system 1 can be installed in moving vehicles such as vehicles, ships, airplanes, and robots, and can be applied to fixed power sources. Here, the fuel cell system 1 installed in a car will be described as an example. The fuel cell system 1 includes a polymer electrolyte fuel cell 2. The fuel cell 2 includes a fuel cell stack 3 that is formed by stacking a plurality of unit cells each including a cathode electrode, an anode electrode, and an electrolyte membrane arranged between the cathode and anode electrodes, and includes a cathode flow path 3a and an anode flow path 3b formed inside the fuel cell stack 3. The electrolyte membrane is, for example, a solid high polymer electrolyte membrane with proton conductivity. FIG. 1 omits the illustration of the unit cells. Inside the fuel cell stack 3, a coolant flow path 3c through which coolant that cools the fuel cell stack 3 flows is located. In the fuel cell stack 3, hydrogen gas, i.e., anode gas, is supplied to the anode electrode, and air containing oxygen, i.e., cathode gas is supplied to the cathode electrode. Hydrogen ions produced by a catalytic reaction in the anode electrode pass through the electrolyte membrane, move to the cathode electrode, and react electrochemically with oxygen to generate electricity. Connected to the fuel cell stack 3 are a voltmeter V measuring the voltage of generated electricity and an ammeter A measuring the current of generated electricity. The coolant flowing through the coolant flow path 3c cools the fuel cell stack 3. However, when the fuel cell 2 is started at low temperature, coolant is used to increase the temperature of the fuel cell stack 3.

A cathode gas supply flow path 4 is connected to the inlet of the fuel cell stack 3, more specifically, an inlet 3a1 of the cathode flow path 3a of the fuel cell stack 3. An air cleaner 4a is attached to the end of the cathode gas supply flow path 4. A compressor K1 that compresses and supplies cathode gas to the fuel cell stack 3 is arranged in the cathode gas supply flow path 4. In addition, in the cathode gas supply flow path 4, an intercooler 5 is arranged between the inlet 3a1 of the cathode flow path 3a and an outlet K1a of the compressor K1. The intercooler 5 is connected to a coolant circulation flow path 17, and exchanges heat with coolant to cool the cathode gas discharged from the compressor K1. The coolant circulation flow path 17 through which coolant circulates will be described in detail later. Furthermore, in the cathode gas supply flow path 4, a first thermometer T1 is arranged between the compressor K1 and the intercooler 5, and a pressure gauge P is arranged further downstream than the intercooler 5. The first thermometer T1 measures the temperature of cathode gas.

Arranged in the cathode gas supply flow path is a regulating valve V1 that regulates the pressure between the outlet K1a of the compressor K1 and the inlet 3a1 of the fuel cell stack 3.

A cathode off-gas exhaust flow path 6 is connected to an outlet 3a2 of the cathode flow path 3a of the fuel cell stack 3. A back pressure valve V2 is arranged in the cathode off-gas exhaust flow path 6. The back pressure valve V2 regulates the pressure in a region located further downstream than the compressor K1 in the cathode gas supply flow path 4 and further upstream than the cathode flow path 3a and the back pressure valve V2 in the cathode off-gas exhaust flow path 6, i.e., cathode back pressure. However, the pressure between the downstream side of the compressor K1 and the regulating valve V1 can be regulated by the open degree of the regulating valve V1. That is, the pressure between the compressor K1 and the regulating valve V1 is controlled separately from the pressure in the cathode flow path 3a. In the cathode off-gas exhaust flow path 6, a muffler 7 is arranged further downstream than the back pressure valve V2.

The fuel cell system 1 includes a circulation flow path 8 that diverges from the cathode gas supply flow path 4 at the downstream side of the compressor K1 and is connected to the upstream side of the compressor K1. A circulation control valve V3 of which the open degree is adjustable is arranged in the circulation flow path 8. The circulation flow path 8 diverges, more specifically, between the compressor K1 and the intercooler 5, from the cathode gas supply flow path 4. When the circulation control valve V3 is opened, the cathode gas prior to being introduced into the intercooler 5 is supplied to the compressor K1 again, and the temperature increase of the cathode gas is promoted.

An anode supply flow path 9 is connected to an inlet 3b1 of the anode flow path 3b of the fuel cell stack 3. A hydrogen tank 10, which is a hydrogen supply source, is connected to the end of the anode supply flow path 9. High-pressure hydrogen is stored in the hydrogen tank 10. A shut valve 11 that shuts down the supply of hydrogen and a regulator 12 that reduces the pressure of hydrogen are arranged in the anode supply flow path 9.

An exhaust pipe 13 is connected to an outlet 3b2 of the anode flow path 3b of the fuel cell stack 3. A gas-liquid separator 14 is arranged at the end of the exhaust pipe 13. At the gas-liquid separator 14, a circulation flow path 15a and a purge flow path 15b diverge. The gas-liquid separator 14 isolates water contained in anode off-gas. The anode off-gas of which water has been isolated is discharged to the circulation flow path 15a. On the other hand, isolated water is discharged to the purge flow path 15b. A pump P1 is arranged in the circulation flow path 15a. The arrangement of the pump P1 in the circulation flow path 15a allows anode off-gas to be supplied again to the anode flow path 3b. The purge flow path 15b diverging at the gas-liquid separator 14 is connected to the downstream side of the back pressure valve V2 located in the cathode off-gas exhaust flow path 6. A purge valve 16 is arranged in the purge flow path 15b. When the purge valve 16 is opened, anode off-gas not to be circulated is discharged together with cathode off-gas.

A first end of the coolant circulation flow path 17 is connected to an inlet 3c1 of the coolant flow path 3c in the fuel cell stack 3. In addition, a second end of the coolant circulation flow path 17 is connected to an outlet 3c2 of the coolant flow path 3c. In the coolant circulation flow path 17, arranged is a pump P2 that circulates and supplies coolant into the fuel cell stack 3. In addition, a radiator 18 is arranged in the coolant circulation flow path 17. The coolant circulation flow path 17 includes a three-way valve 19. At the three-way valve 19, a bypass flow path 20 that bypasses the radiator 18 diverges. The three-way valve 19 is a so-called thermostatic type valve that includes a temperature sensor and opens and closes in accordance with the temperature of coolant, but may be an electric valve. The three-way valve 19 makes coolant circulate through the radiator 18 to cool the coolant when the temperature of coolant becomes greater than a predetermined value. A second thermometer T2 that measures the temperature of coolant is arranged between the three-way valve 19 of the coolant circulation flow path 17 and the outlet 3c2 of the coolant flow path 3c.

The intercooler 5 is connected to the coolant circulation flow path 17. More specifically, a first leading flow path 17a and a second leading flow path 17b diverge from the coolant circulation flow path 17. The first leading flow path 17a diverges between the pump P2 and the inlet 3c1 of the coolant flow path 3c, and another end of the first leading flow path 17a is connected to the intercooler 5. Coolant flows into the intercooler 5 through the first leading flow path 17a. On the other hand, the second leading flow path 17b diverges between the three-way valve 19 and the outlet 3c2 of the coolant flow path 3c, and another end of the second leading flow path 17b is connected to the intercooler 5. Coolant returns from the intercooler 5 to the coolant circulation flow path 17 through the second leading flow path 17b.

The fuel cell system 1 includes an ECU (Electronic Control Unit) 21. The ECU 21 is configured as a microcomputer including a CPU, a ROM, and a RAM thereinside, and functions as a controller. The ECU 21 electrically connects to the first thermometer T1, the pressure gauge P, the voltmeter V, and the ammeter A. The ECU 21 also electrically connects to the compressor K1, and the pumps P1 and P2, and controls the drive of them. In addition, the ECU 21 electrically connects to the regulating valve V1, the back pressure valve V2, the circulation control valve V3, the shut valve 11, the regulator 12, and the purge valve 16, and controls opening and closing of these valves. Detected values by other sensors are also input to the ECU 21. In addition, the ECU 21 stores a current-voltage map and the like. The ECU 21 executes an output setting process. That is, the ECU 21 sets a current to be output based on the amount of air to be supplied, a cathode back pressure, the amount of hydrogen to be supplied, a hydrogen pressure, an output history, a voltage, and a current value map. The ECU 21 controls increase in coolant temperature by controlling the regulating valve V1 when the temperature increase of the fuel cell stack 3 is requested based on the measurement value by the second thermometer T2, i.e., at so-called low-temperature starting.

Figure 2:
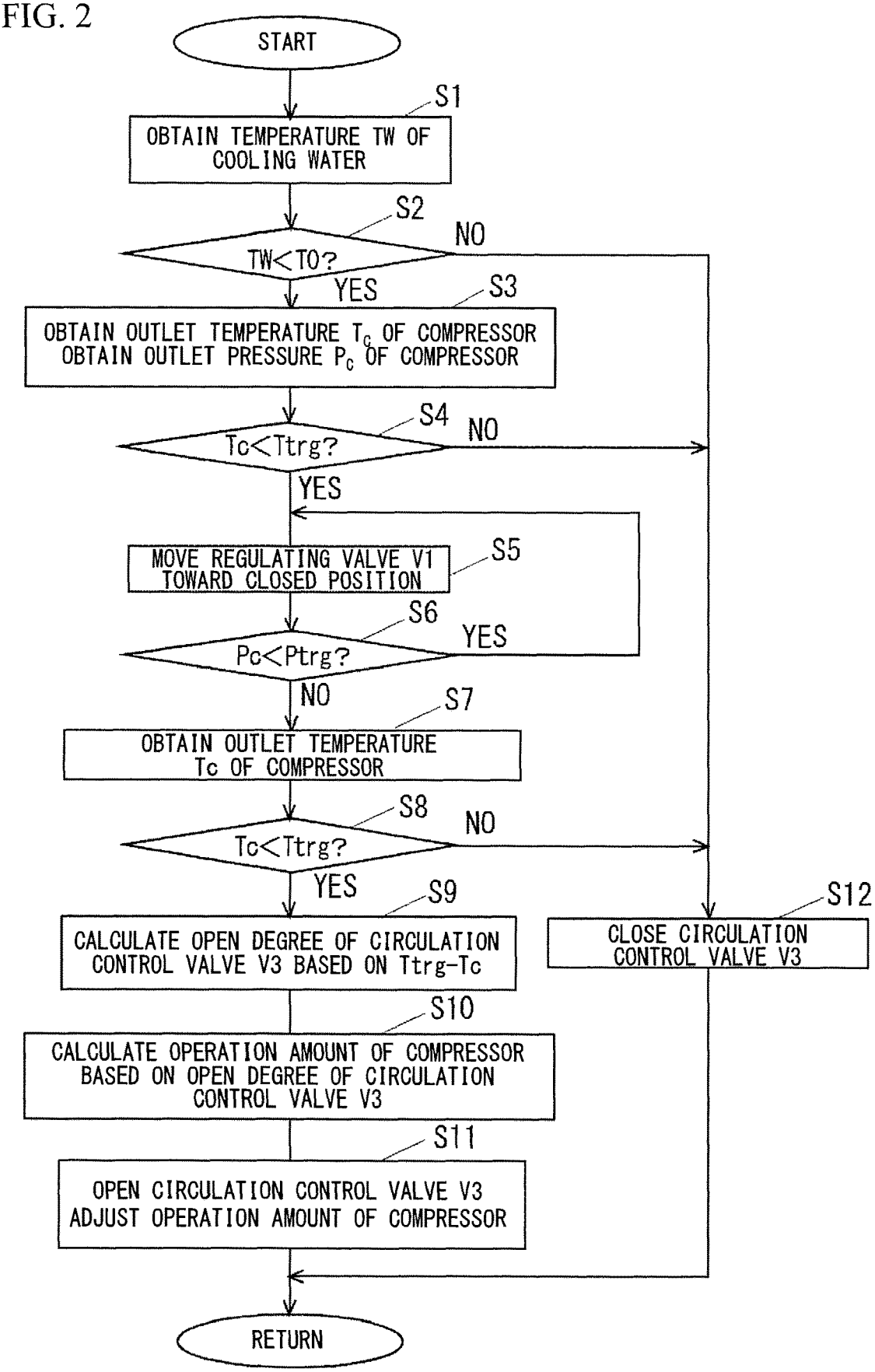
FIG. 2 is a flowchart illustrating a control of the fuel cell system in the first embodiment.

Next, with reference to FIG. 2, the control of the fuel cell system 1 of the first embodiment will be described. FIG. 2 is a flowchart illustrating a control of the fuel cell system 1 in the first embodiment. The ECU 21 independently controls the fuel cell system 1.

At step S1, the ECU 21 obtains a temperature TW of coolant through the second thermometer T2. Then, at step S2, the ECU 21 determines whether the temperature TW is less than a predetermined threshold value T0. Here, the threshold value T0 is a reference value used to determine whether the fuel cell 2 is being started at low temperature. The threshold value T0 is preliminarily set and stored in the ECU 21. When the determination at step S2 is YES, the process moves to step S3. At step S3, the ECU 21 obtains an outlet temperature Tc of the compressor K1 through the first thermometer T1 and an outlet pressure Pc of the compressor K1 through the pressure gauge P. Then, the process moves to step S4. At step S4, the ECU 21 determines whether the outlet temperature Tc of the compressor K1 is less than a predetermined target temperature Ttrg. Here, the target temperature Ttrg is preliminarily set as a temperature at which the temperature of coolant can be effectively increased in the intercooler 5, and is stored in the ECU 21.

When the determination at step S4 is YES, the process moves to step S5. At step S5, the ECU 21 moves the regulating valve V1 toward the closed position. This control separates the region between the outlet K1a of the compressor K1 and the regulating valve V1 and the region at the downstream side of the regulating valve V1, more specifically, the cathode flow path 3a, and allows the pressure in each region to be controlled individually. That is, the back pressure of the fuel cell stack 3 can be controlled to be its required pressure while the pressure at the downstream side of the compressor K1 can be made greater than the required pressure of the fuel cell stack 3. In the cathode flow path 3a, the cathode gas flow rate is decreased, and the fuel cell stack 3 becomes in a state capable of executing the low-efficiency operation. Thus, the temperature increase of the fuel cell stack 3 can be promoted.

On the other hand, the pressure in the cathode gas supply flow path 4 located further upstream than the regulating valve V1 starts increasing. At step S6 subsequent to step S5, the ECU 21 determines whether the outlet pressure Pc of the compressor K1 is less than a predetermined target pressure Ptrg. Here, the target pressure Ptrg is preliminarily set as a pressure at which the temperature of coolant can be effectively increased in the intercooler 5, and is stored in the ECU 21.

When the determination at step S6 is NO, the process moves to step S7. On the other hand, when the determination at step S6 is YES, the processes from step S5 are repeated till the determination at step S6 becomes NO. At step S7, the ECU 21 obtains the outlet temperature Tc of the compressor K1 again through the first thermometer T1. At step S8 subsequent to step S7, the ECU 21 determines again whether the outlet temperature Tc of the compressor K1 is less than the predetermined target temperature Ttrg. The target temperature Ttrg is the same as used at step S4. When the determination at step S8 is YES, i.e., when the outlet pressure Pc of the compressor K1 reaches the target pressure Ptrg but the outlet temperature Tc does not reach the target temperature Ttrg although the regulating valve V1 is controlled to move toward the closed position, the process moves to step S9. At step S9, the ECU 21 calculates the open degree of the circulation control valve V3 based on the difference between Ttrg and Tc (Ttrg-Tc), i.e., the desired temperature to be increased. Then, at step S10, the ECU 21 calculates the operation amount of the compressor K1 based on the open degree of the circulation control valve V3 calculated at step S9. When the circulation control valve V3 is opened, a part of the cathode gas discharged from the compressor K1 flows into the circulation flow path 8. As a result, when no measure is taken, the flow rate of the cathode gas flowing into the intercooler 5 and the fuel cell stack 3 decreases. If the amount of the cathode gas flowing into the intercooler 5 decreases, the efficiency of the heat exchange in the intercooler 5 decreases. If the amount of the cathode gas flowing into the fuel cell stack 3 decreases, a desired power generation reaction is not achieved in the fuel cell stack 3. Thus, at step S10, the ECU 21 sets the operation amount of the compressor K1 so that the decline in the amount of the cathode gas flowing into the intercooler 5 and the fuel cell stack 3 due to the opening of the circulation control valve V3 is compensated. At step S11 subsequent to step S10, the ECU 21 opens the circulation control valve V3 and adjusts the operation amount of the compressor. More specifically, the ECU 21 increases the operation amount of the compressor K1. When the circulation control valve V3 is opened, a part of the cathode gas once discharged from the compressor K1 is sent again to the compressor K1 through the circulation flow path 8. Accordingly, the temperature increase of the cathode gas discharged again from the compressor K1 is promoted. In addition, at this time, since the operation amount of the compressor K1 is increased, the decrease in temperature increase effect due to the decrease in flow rate of the cathode gas flowing into the intercooler 5 can be also avoided. In the present embodiment, the open degree of the circulation control valve V3 is calculated based on the difference between Ttrg and Tc (Ttrg-Tc), and the operation amount of the compressor K1 is set based on the calculated open degree of the circulation control valve V3. Instead of the above described control, the combinations of the open degree of the circulation control valve V3 and the operation amount of the compressor K1 taking the open degree into account may be preliminarily prepared, and the ECU 21 may select the suitable combination of the open degree of the circulation control valve V3 and the operation amount of the compressor K1 based on the difference between Ttrg and Tc (Ttrg-Tc). When the process at step S11 ends, the processes from step S1 are repeated.

On the other hand, when the determination at step S2 is NO, when the determination at step S4 is NO, or when the determination at step S8 is NO, the process moves to step S12. At step S12, the ECU 21 determines that the control for increasing the temperature of cathode gas is unnecessary, and closes the circulation control valve V3. That is, the ECU 21 stops circulating cathode gas through the circulation flow path 8. When the process at step S12 ends, the processes from step S1 are repeated. When the determination at step S2 is NO, the ECU 21 keeps the regulating valve V1 open.

The execution of the above described control increases the temperature of cathode gas to be supplied to the intercooler 5, and as a result, the temperature of coolant to be supplied to the fuel cell stack 3 rapidly increases. Then, the temperature of the fuel cell stack 3 increases, and the fuel cell 2 can be appropriately started even at low-temperature starting. That is, the present embodiment can achieve both the low-efficiency operation of the fuel cell stack 3 and the use of the heat of the cathode gas of which the temperature is increased by increasing the pressure at the downstream side of the compressor K1. Accordingly, the fuel cell 2 can be appropriately started even at low-temperature starting.

Second Embodiment

Figure 3:
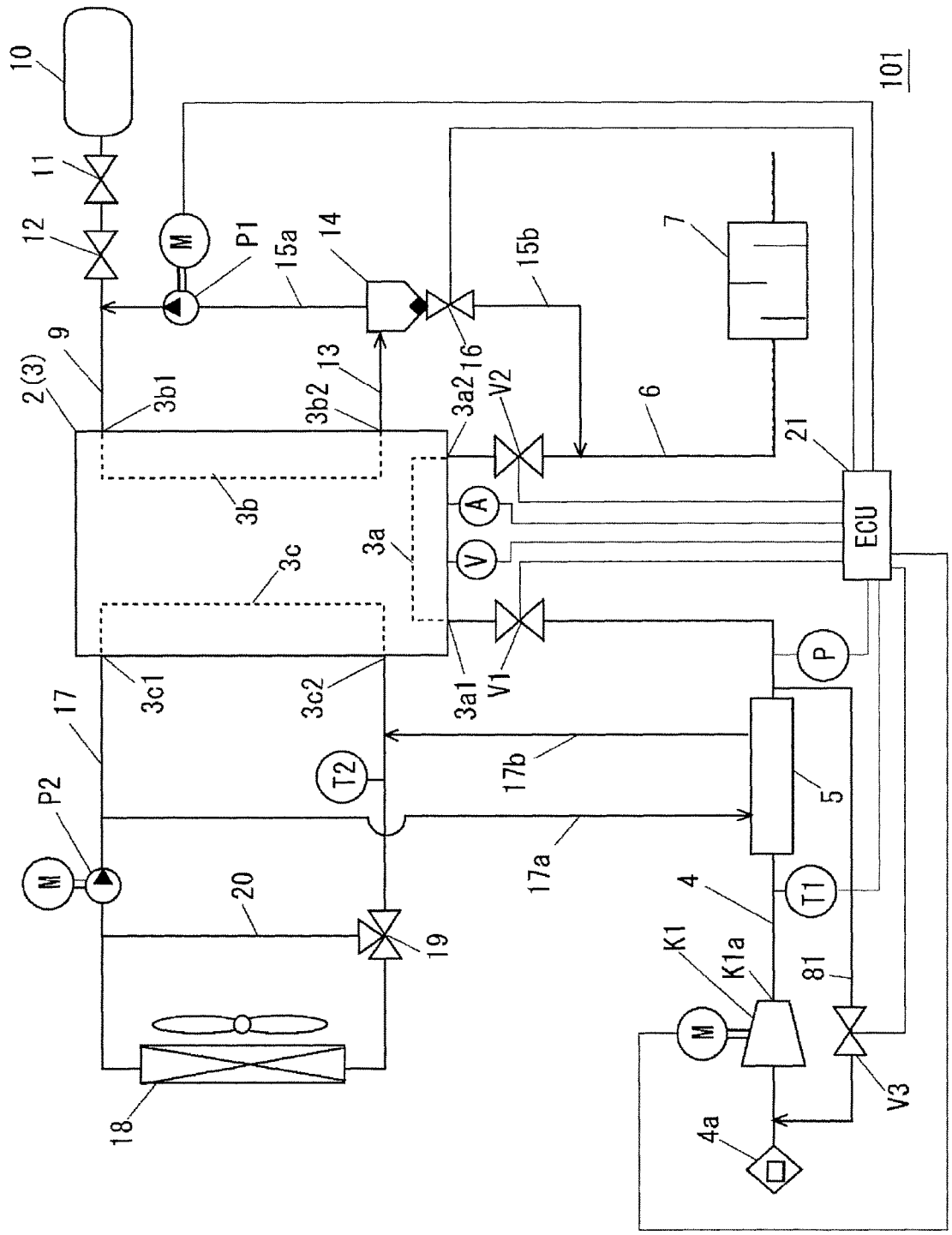
FIG. 3 illustrates an outline structure of a fuel cell system in accordance with a second embodiment.

With reference to FIG. 3, a second embodiment will be described. A fuel cell system 101 of the second embodiment differs from the fuel cell system 1 of the first embodiment in the following points described below. The fuel cell system 101 of the second embodiment differs from the fuel cell system 1 of the first embodiment in the point at which a circulation flow path 81 diverges. Accordingly, the settings for the open degree of the circulation control valve V3 and the operation amount of the compressor K1 when the circulation control valve V3 is opened differ. The flowchart illustrated in FIG. 2 is also used in the second embodiment.

The circulation flow path 8 in the first embodiment diverges between the compressor K1 and the intercooler 5. Thus, in the first embodiment, if the circulation control valve V3 is opened while the operation amount of the compressor K1 is maintained, the flow rate of the cathode gas flowing into the intercooler 5 and the fuel cell stack 3 decreases. To deal with this phenomenon, at step S10 in the first embodiment, the operation amount of the compressor K1 is set so that the decline in the amount of the cathode gas flowing into the intercooler 5 and the fuel cell stack 3 due to the opening of the circulation control valve V3 is compensated. In contrast, the circulation flow path 81 of the second embodiment diverges at the downstream side of the intercooler 5. Thus, in the second embodiment, if the circulation control valve V3 is opened while the operation amount of the compressor K1 is maintained, the flow rate of the cathode gas flowing into the fuel cell stack 3 decreases. Thus, to deal with this phenomenon, at step S10 in the second embodiment, the operation amount of the compressor K1 is set so that the decline in the amount of the cathode gas flowing into the fuel cell stack 3 due to the opening of the circulation control valve V3 is compensated. This setting allows the cathode gas that has been discharged again from the compressor K1 and increased in temperature to be supplied to the fuel cell stack 3 without decreasing the flow rate of the cathode gas. In addition, the flow rate of the cathode gas flowing into the intercooler 5 is increased, and the effect in increasing the temperature of coolant is thus enhanced.

While the exemplary embodiments of the present invention have been illustrated in detail, the present invention is not limited to the above-mentioned embodiments, and other embodiments, variations and variations may be made without departing from the scope of the present invention.

DESCRIPTION OF LETTERS OR NUMERALS 1, 101 fuel cell system
2 fuel cell
3 fuel cell stack
3a cathode flow path
3b anode flow path
3c coolant flow path
4 cathode gas supply flow path
5 intercooler
6 cathode off-gas exhaust flow path
8 circulation flow path
17 coolant circulation flow path
17a first leading flow path
17b second leading flow path
K1 compressor
V1 regulating valve
V2 back pressure valve
V3 circulation control valve

The invention claimed is:

1. A fuel cell system comprising:
a fuel cell stack;
a coolant circulation path through which coolant for cooling the fuel cell stack flows;
a cathode gas supply flow path that is connected to an inlet of the fuel cell stack, and in which a compressor that supplies cathode gas to the fuel cell stack is arranged;
an intercooler that is arranged between an outlet of the compressor and the inlet of the fuel cell stack in the cathode gas supply flow path, is connected to the coolant circulation path, and cools cathode gas discharged from the compressor with use of the coolant;
a regulating valve that is arranged between the intercooler and the inlet of the fuel cell stack in the cathode gas supply flow path; and
an electronic control unit,
wherein the electronic control unit is configured to control the regulating valve to increase a pressure in a first part of the cathode gas supply flow path separately from a pressure in a second part of the cathode gas supply flow path when increase in temperature of the fuel cell stack is requested, the first part including the intercooler and being from the outlet of the compressor to the regulating valve, the second part including a cathode flow path formed in the fuel cell stack and being located further downstream than the regulating valve.

2. The fuel cell system according to claim 1, further comprising:
a circulation path that diverges from the cathode gas supply flow path at a downstream side of the compressor, and is connected to an upstream side of the compressor; and
a circulation control valve that is arranged in the circulation path, and that circulates the cathode gas to the cathode gas supply flow path and the circulation path including the compressor when the increase in temperature of the fuel cell stack is requested.

3. The fuel cell system according to claim 2, wherein the circulation path diverges from the cathode gas supply flow path between the compressor and the intercooler.

4. The fuel cell system according to claim 2, wherein the circulation path diverges from the cathode gas supply flow path at a downstream side of the intercooler.

* * * * *